US009066503B2

(12) United States Patent
Baron et al.

(10) Patent No.: US 9,066,503 B2
(45) Date of Patent: Jun. 30, 2015

(54) FILTERING DEVICE FOR PONDS AND THE LIKE

(75) Inventors: Giancarlo Baron, Pozzoleone (IT); Paolo Pettenon, Pozzoleone (IT)

(73) Assignee: SICCE S.P.A., Pozzoleone (VI) (IT)

( * ) Notice: Subject to any disclaimer, the term of this patent is extended or adjusted under 35 U.S.C. 154(b) by 809 days.

(21) Appl. No.: 13/061,138

(22) PCT Filed: Aug. 26, 2009

(86) PCT No.: PCT/IB2009/053741
§ 371 (c)(1),
(2), (4) Date: May 16, 2011

(87) PCT Pub. No.: WO2010/023631
PCT Pub. Date: Mar. 4, 2010

(65) Prior Publication Data
US 2011/0203981 A1 Aug. 25, 2011

(30) Foreign Application Priority Data

Aug. 26, 2008 (EP) .................................... 08425573

(51) Int. Cl.
*C02F 1/00* (2006.01)
*B08B 3/00* (2006.01)
(Continued)

(52) U.S. Cl.
CPC ............ *A01K 63/045* (2013.01); *B01D 29/114* (2013.01)

(58) Field of Classification Search
CPC .. B01D 29/705; B01D 2201/06; B01D 29/70; B01D 2275/302; B01D 29/114; B01D 24/4668; B01D 2201/184; B01D 2201/186; B01D 2275/203; A01K 63/045; Y10T 16/451

USPC ............................................. 210/350, 170.09
See application file for complete search history.

(56) References Cited

U.S. PATENT DOCUMENTS

| 515,769 A | 3/1894 | Harris |
| 2,253,516 A | 8/1941 | Haldeman |

(Continued)

FOREIGN PATENT DOCUMENTS

| EP | 1420869 B | 12/2006 |
| JP | 60 038010 A | 2/1985 |
| WO | 03011113 A2 | 2/2003 |

OTHER PUBLICATIONS

ISR from parent application PCT/IB2009/053741.

(Continued)

*Primary Examiner* — Bobby Ramdhanie
*Assistant Examiner* — Denise R Anderson
(74) *Attorney, Agent, or Firm* — Kristina Castellano; Castellano PLLC

(57) ABSTRACT

A filtering device, allowing to provide an effective filtering without either requiring particular efforts to the user or imposing him or her to operate in excessively hard positions, comprises a filtering element comprised between a first and a second supporting surface, the distance between the supporting surfaces being adjustable, so as to compress the filtering element by moving the supporting surfaces the nearer the other, and actuating device apt to modify the distance of the supporting surfaces. The actuating device is selectively connectable to a surface of the supporting surfaces in a such way that the actuating device can alternatively move unrelated to motion of the surfaces so as to be placed in an operative configuration or move integral to the surface so as to modify the distance between the surfaces in order to compress the filtering element.

8 Claims, 4 Drawing Sheets

(51) Int. Cl.
*A01K 63/04* (2006.01)
*B01D 29/11* (2006.01)

(56) References Cited

U.S. PATENT DOCUMENTS 4,022,694 A * 5/1977 Fruman .................. 210/350
4,579,657 A * 4/1986 Hood, Jr. .................. 210/314
5,690,825 A * 11/1997 Parton .................. 210/350
7,093,720 B2 * 8/2006 Hoffmeier .................. 210/350

OTHER PUBLICATIONS

Written Opinion from parent application PCT/IB2009/053741.

* cited by examiner

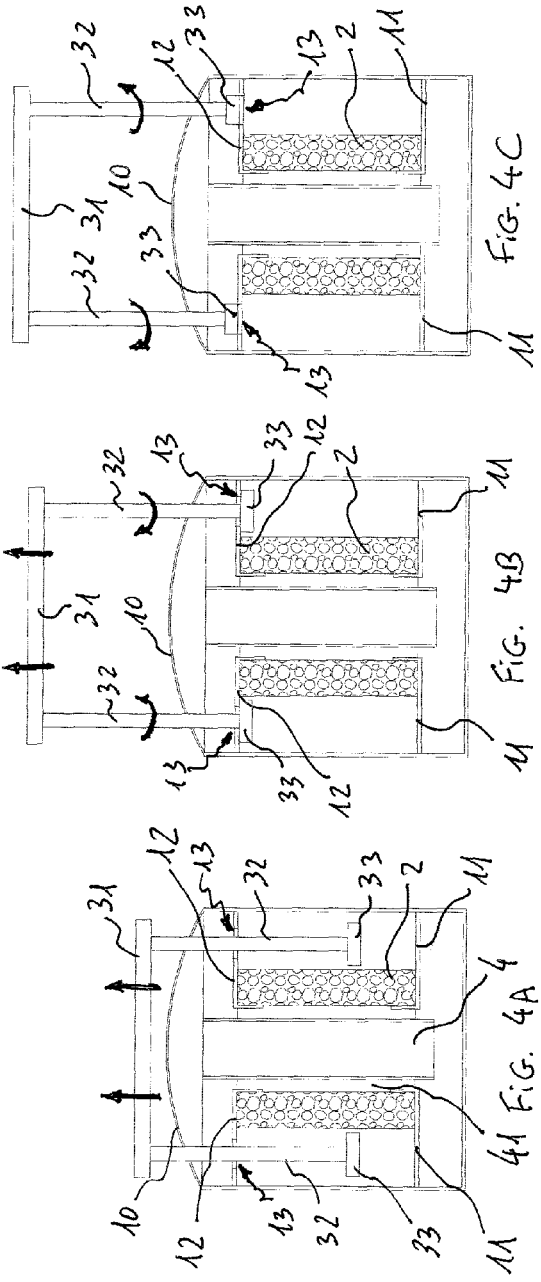
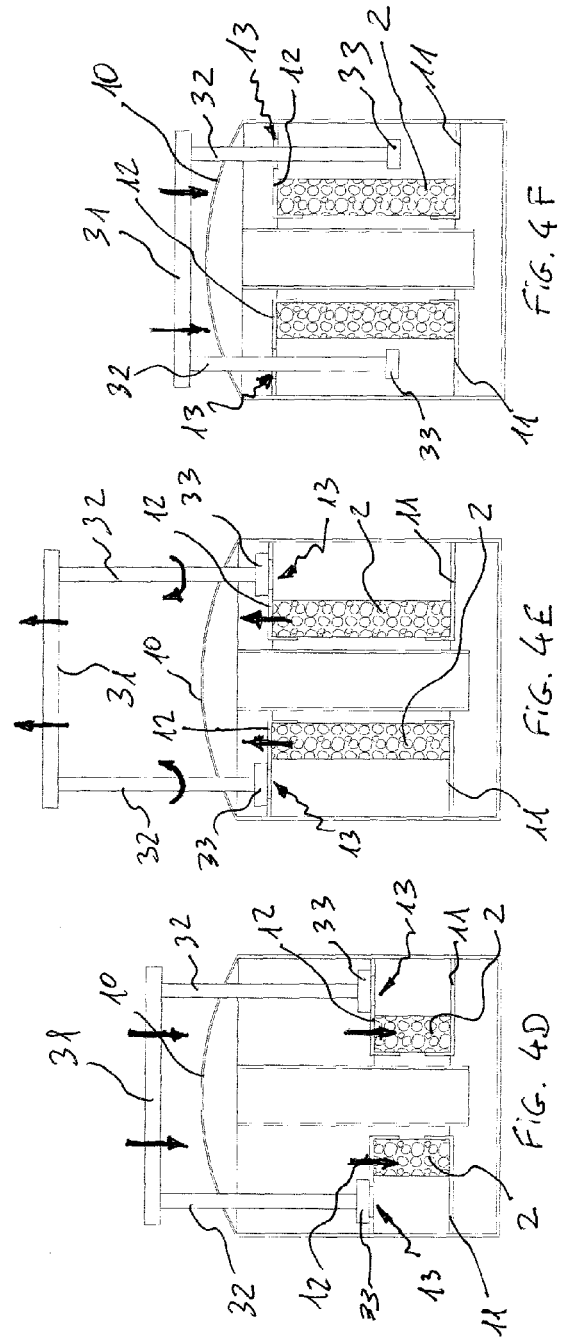

FILTERING DEVICE FOR PONDS AND THE LIKE

CLAIM FOR PRIORITY

This application is a U.S. National Stage Application of PCT/IB2009/053741 filed on Aug. 26, 2009, claiming priority to European Application No. 08 425 573.6 filed Aug. 26, 2008, the contents of both of which are incorporated herein by reference.

TECHNICAL FIELD

The present invention refers to a filtering device for ponds and the like.

TECHNOLOGICAL BACKGROUND

Artificial ponds placed in gardens require the use of a filtering device for keeping the water contained therein sufficiently clean.

For this purpose, it is known to the art the use of filtering devices that intake water from the pond, filter it by a filtering element placed therein, and deliver it back inside the pond. Nevertheless, it is evident that the filtering element will be quickly obstructed by impurities and dirt in the pond. Accordingly, such filtering devices have systems for providing a periodical cleaning of the filtering element, so as to remove the impurities and the dirt thereby collected.

Such systems should require only a minimal intervention from the user and, in particular, they should not require any maintenance of the filtering device. For this purpose, it is used a system for cleaning the filtering element that inverts the flow of the water within the device in order to remove impurities and then eliminate the water used for rinsing. This operation is achieved by using selective ducts allowing to modify the flow of the liquid in the device by means of a suitable leverage, and thus taking water from the pond and causing it to flow through the filtering element, without delivering it back in the pond.

Nevertheless, this system does not prove to be enough effective since a simple rinse of the filter does not suffice to a complete removal of the impurities present therein.

In order to obtain an improved cleaning of the filtering element, European Patent EP 1 420 869 to Oase GmbH, describes a filtering device wherein the filtering element is held between two surfaces capable of moving the one near the other so as to press it and thus improving the rinse thereof.

The device described in the patent proves to be little practical in use, since the actuating device allowing the surface to approach each other and press the filtering element, should be used in a particularly uncomfortable working position and it requires a remarkable physical force to perform the operation of compression.

In fact, in this device the surfaces are placed one above the other and a handle is used to raise the lower surface, bring it neared to the upper one and thus comprising the filtering element.

Nevertheless, these filtering devices normally lay underground and, as a consequence, the back of the user operating on the handle is un-conveniently stressed, as the handle, in fact, will need to be pulled upward to press the filtering element.

It should be also understood that this operation could be made by elder people or repeated for several times in big-sized gardens, wherein several ponds filtering devices are present.

Hence, the technical problem underlying the present invention is to provide a filtering device for ponds allowing to overcome the drawbacks mentioned above with reference to the known art.

SUMMARY OF THE INVENTION

The above mentioned problem is solved by a filtering device for ponds and the like, comprising a filtering element comprised between a first and a second supporting surface, the distance between the supporting surfaces being adjustable so as to compress the filtering element by moving the supporting surfaces the one near the other, an actuating device apt to modify the distance of the supporting surfaces and a reversible connecting member apt to selectively provide a connection between the actuating device and the supporting surface, such that the actuating device can alternatively:
  move unrelated to the motion of the surfaces so as to be placed in an operative configuration; or
  move integral to the surface so as to modify the distance between the surfaces in order to compress the filtering element,
wherein the filtering element is compressed by pushing the actuating device towards the filtering element.

Furthermore, such problem is also solved by a cleaning method of a filtering device, the filtering device comprising a filtering element comprised between a first and a second supporting surface, and an actuating device alternatively apt to move unrelated to the motion of the supporting surfaces or to move together with a surface of the supporting surfaces, so as to modify the distance of the supporting surfaces, the method comprising the steps of:
  setting the actuating device in an operative configuration;
  connecting the actuating device to the surface so as to make the actuating device integral to the surface;
  moving the supporting surfaces the one near the other by pushing the actuating device towards the filtering element so as to compress the filtering element;
  rinsing the filtering element.

The present invention provides several relevant advantages. The main advantage lies in that device according to the present invention allow to provide an effective filtering without either requiring particular efforts to the user or imposing him or her to operate in excessively hard positions.

Other advantages, features and the operation modes of the present invention will be made apparent from the following detailed description of some embodiments thereof, given by way of a non-limiting example.

BRIEF DESCRIPTION OF THE DRAWINGS

Reference will be made to the figures of the annexed drawings, wherein:
FIGS. 4A to 4F are schematic views schematically showing the cleaning method of the filtering device according to the present invention.

DETAILED DESCRIPTION OF THE INVENTION

Figure 1:
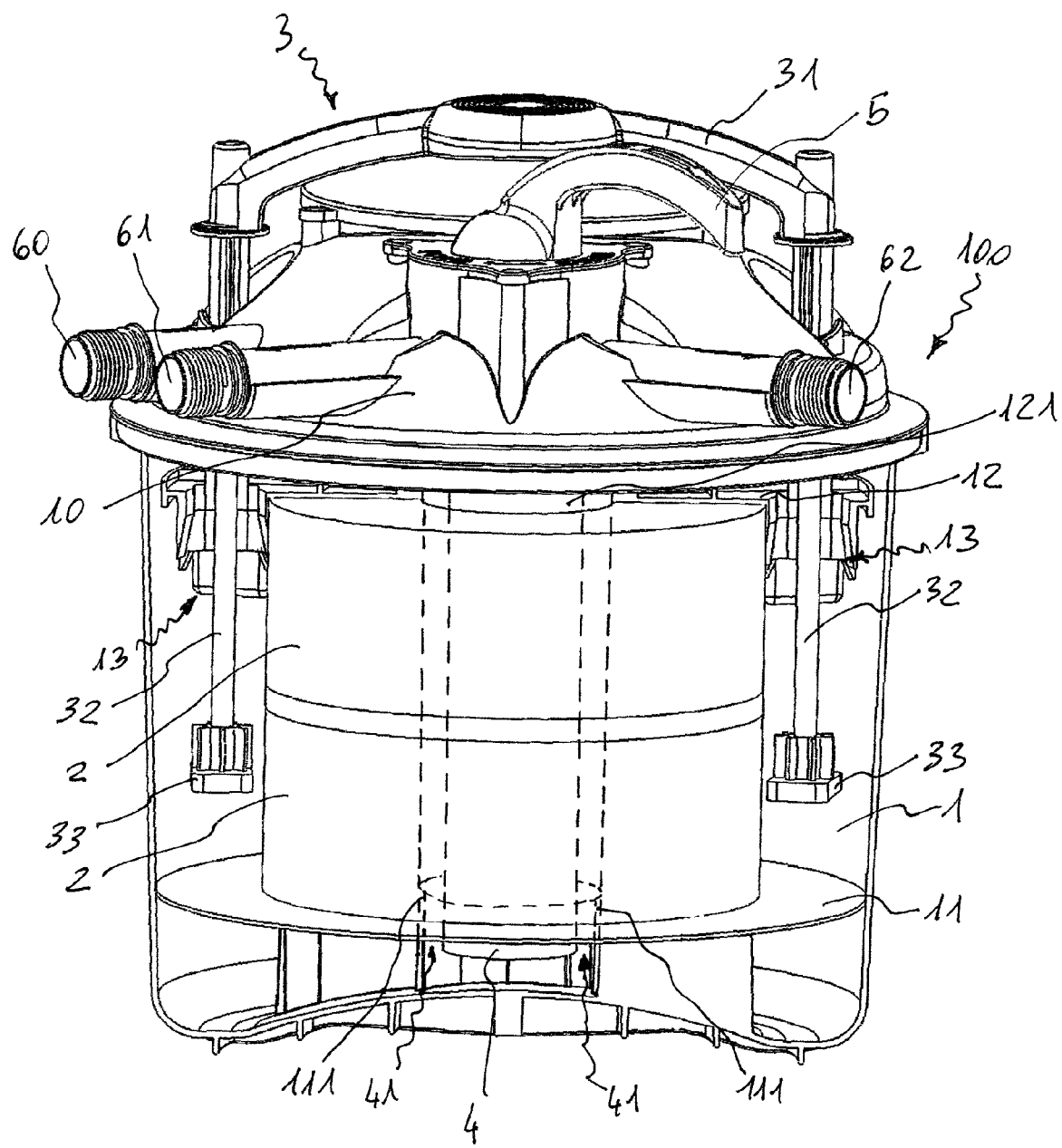
FIG. 1 is a partially sectional perspective view of a filtering device according to the present invention.

With reference initially to FIG. 1, a filtering device according to the present invention is on the whole shown with the reference 100.

The device 100 comprises a container 1, provided with a closing lid 10. At the closing lid 10 there are provided an inlet 60 for the water coming from the pond, an outlet 61 for the delivery of the filtered water to the pond and an outlet 62 for delivery water during the rinsing step, which will be described in details in the following.

A filtering element 2 is placed inside the container 1, made, e.g., in spongy materials and, in particular, could be composed of a set of overlapped filtering elements 2.

The filtering element 2 is comprised between two supporting surfaces 11, 12 which could be brought the one near the other so as to compress the filtering element 2, as will be seen in the following.

For a better explanatory clearness, in the following it will be indicated as upper support surface 12 the surface closest to the lid 10 and lower support surface 11 the one opposed thereto. In fact, it should be noted that the device 100 is used laying on the ground or, preferably, underground, so that the lid is placed at the same level of the ground and substantially parallel thereto.

The device further comprises an actuating device 3 allowing to vary the distance between the supporting surfaces 11 and 12.

Nevertheless, the actuating device 3 could selectively operate according two different modes, a first one in which their motion is unrelated to the motion of the surfaces 11 and 12 and a second one in which they move integral with the upper surface 12.

In further detail, actuating device 3 comprises a handle 31 connected to two oblong elements 32 developing inside container 1. In the configuration in which the actuating device 3 is unrelated to surfaces 11 and 12, the oblong elements 32 are free to slide inside suitable holes provided on the lid 1—not shown in figure—so that the handle 31 could be partially moved away from the lid 10. A Reversible connecting member 33 is provided between the actuating device and the supporting surface 12 at respective ends of the oblong elements 32.

Then, such reversible connecting member 33 could selectively engage in suitable seats 13 provided on the supporting surface 12, thus either making the actuating device 3 integral with the surface 12, or disengage from them, so as to make the surface 12 unrelated to the actuating device 3.

Such reversible connecting member 33 could, e.g., be formed by a shape coupling. More precisely, in the present embodiment, the reversible connecting member comprises pivoting blocks 33, pivoting about an axis substantially corresponding to the longitudinal direction of the oblong elements 32.

Knobs 34 are placed at the joint between the handle 31 and the oblong elements 32, allowing to move the blocks 33 about the above mentioned axis.

Then, always according to the present embodiment, blocks 33 have a substantially rectangular section that could engage with the seats 13, the latter having a complementary shape. By rotating the knobs 34 either the blocks 33 could slide within the seats 13 or it will be possible to avoid the passage thereof.

With reference to FIGS. 4A to 4F, the operating method of the device according to the present invention will be hereby described.

As shown in FIG. 4A, during the operation of the filtering device 100, the handle 31 is placed near the lid 10. When a rinse of filtering element is desired, the handle 31 and thus the actuating device 3 is moved away from the lid 10 until the connecting member 33 slides over the seats 13, placing the actuating device 3 in an operative configuration. In this step, the connecting member could be rotated by the knobs 34 in order to pass over the seats 13, as can be seen in FIG. 4B.

Once the actuating device 3 is moved apart and, therefore, they have reached the above mentioned operative configuration, the connecting member 33 are pivoted so that they engage in the seats 13. More generally, in this step of the cleaning method of the filtering device, the actuating device 3 is made integral to the surface 12, at least when they are moved towards the lid 10 again.

Accordingly, by placing the handle 31 in the first position, the upper surface 12 will be also moved, approaching the lower surface 11, as could be seen in FIG. 4D. Accordingly, the filtering element 2, which is encompassed between the two surfaces 11 and 12, will be compressed, discharging impurities and the dirt collected during the filtering of water.

In order to achieve a more effective rinsing of the filtering element 2 the device keep on introducing water in the container 1 even when the filtering element 2 is compressed and, during this step, the water is preferably discharged by the outlet 62, so that it is not introduced again in the pond.

Figure 2:
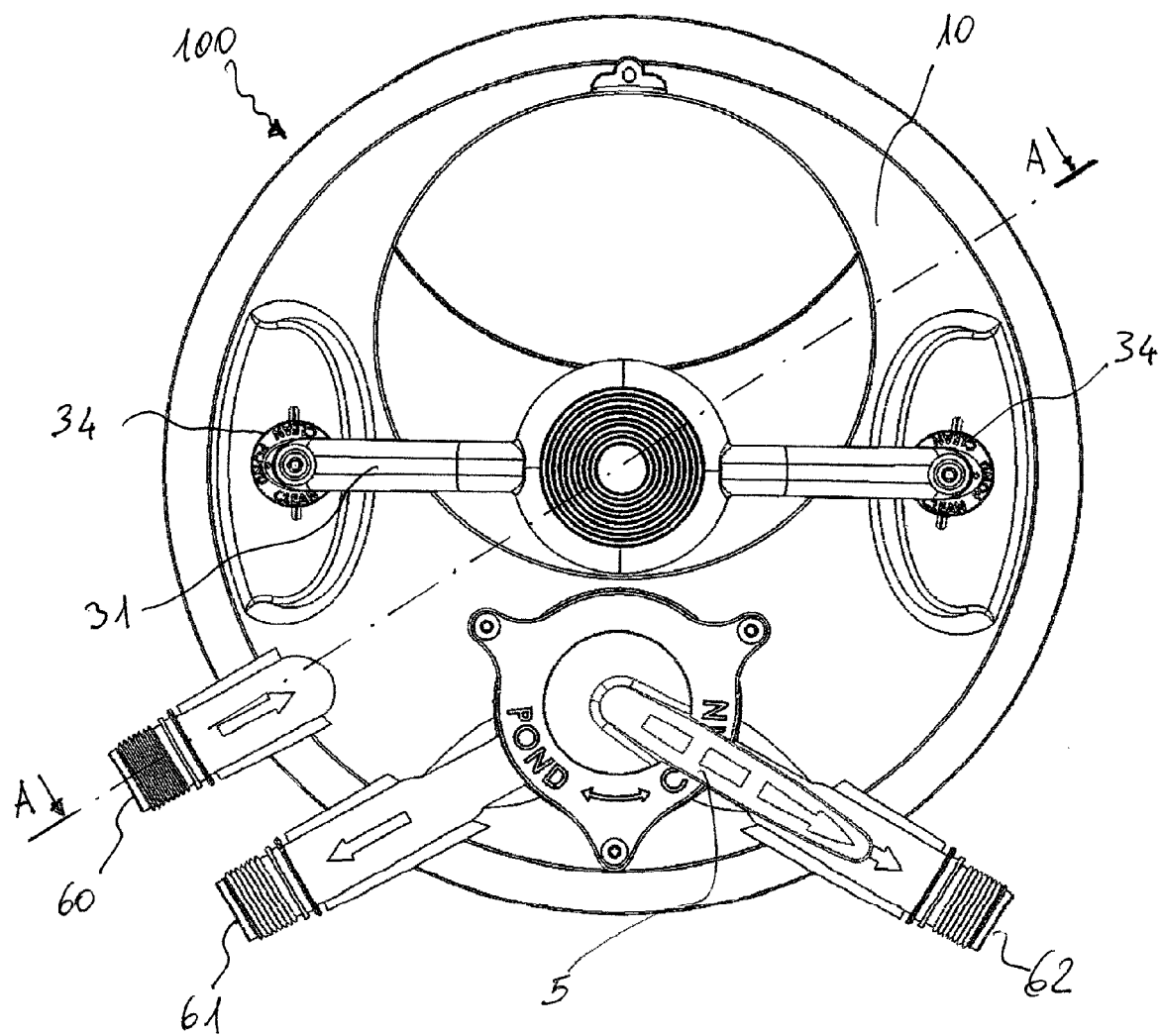
FIG. 2 is an elevated view of the device of FIG. 1.

With reference to FIG. 2, in order to perform such operation, the device 100 has a leverage 5 allowing to select either the outlet 61 or 62 according to the fact that the device is in the filtering step or in the rinsing step. Such systems are anyhow known to a person skilled in the art and, as a consequence, they will not be described in further details.

After having carried out the rinsing of the filtering element 2, the handle 31 is then raised again, thus also raising the supporting surface 12, and allowing the filtering element 2 to expand once again, as shown in FIG. 4E. Finally, the supporting surface 12 can be disengaged from the actuating device 3 operating on the knobs 34 and thus on the connecting member 33, so that it possible to lower the handle once again.

Figure 3:
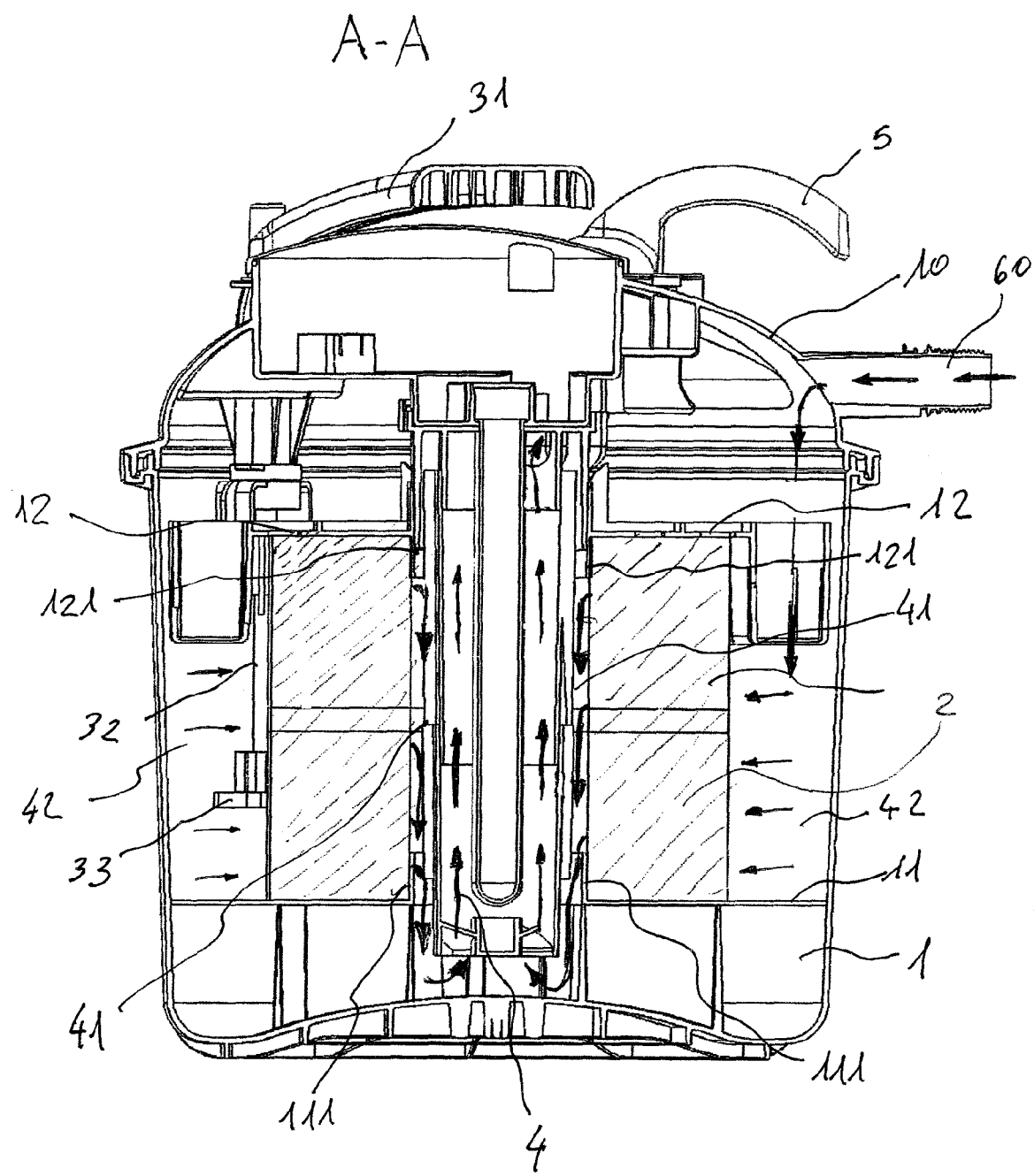
FIG. 3 is a side view according to section A-A of the device of FIG. 2.

With reference now to FIG. 3, the filtering element 2 is preferably annularly shaped and it is held on the surfaces 11 and 12 by means of respective holding walls 111 and 121, better shown in FIG. 1. The device 100 further comprises a discharge central duct 4 connected to the outlet 61 and 62, extending from the lid 10 until it goes over the lower surface 11.

Accordingly, an annular central channel 41 between the filtering element 2 and the discharge central duct 4 is defined. Therefore, as shown in FIG. 3, water in the pond is delivered inside the container 1 in a collecting chamber 42, it passes through the filtering element 2, it is delivered in the external channel 41 and then it flows inside the discharge central duct 4.

It is to be noted that in this way it will be possible to avoid the presence of a plurality of perforations in the discharge duct, provided in the devices according to the known art, thus avoiding possible obstructions of such perforations.

Therefore, the filtering device according to the present invention allows to compress the filtering element 2 just lowering the handle 31, thus in a particularly comfortable manner, unlike known devices. Such operation could be also carried out by pushing the handle with a foot, therefore without stressing excessively the back of the user.

The present invention has hereto been described with reference to preferred embodiments thereof. It is understood that there could be other embodiments referable to the same inventive kernel, all falling within the protective scope of the claims set forth hereinafter.

The invention claimed is:

1. A filtering device for ponds and the like, comprising a filtering element comprised between a first and a second supporting surface, the distance between the supporting surfaces being adjustable so as to compress the filtering element by moving the supporting surfaces the one near the other, an actuating device that modifies the distance of the supporting surfaces and a reversible connecting member that selectively provides a connection between the actuating device and the supporting surface, such that the actuating device can alternatively:
- move unrelated to the motion of the surfaces so as to be placed in an operative configuration; or
- move integral to the surface so as to modify the distance between the surfaces in order to compress the filtering element,
- wherein the filtering element is compressed by pushing the actuating device towards the filtering element;
- wherein the reversible connecting member comprises pivoting blocks pivotally connected to the actuating device by oblong elements, the pivoting blocks being engageable on seats of the supporting surface, the actuating device comprising a handle connected to the oblong elements; and
- wherein the blocks have a substantially rectangular section capable of engaging with the seats, the seats having a complementary shape, such that by rotating knobs connected to the blocks, either the blocks could slide within the seats when the handle is placed in the operative position or it will be possible to avoid passage thereof when the handle is moved integral to the surface so as to compress the filtering element.

2. The filtering device according to claim 1, wherein the reversible connecting member forms a shape coupling with the supporting surface.

3. The filtering device according to claim 1, wherein the actuating device comprises knobs for operating on the connecting member.

4. The filtering device according to claim 1, comprising a discharge central duct, the filtering element extending to holding walls of the supporting surfaces so as to define an annular central channel.

5. The filtering device according to claim 4, wherein water discharged by the filtering element is collected in the annular central channel and then delivered towards the discharge central duct.

6. The filtering device according to claim 1, comprising a container housing the filtering element and the supporting surfaces, the actuating device being movable relative to the container, so that the filtering element is compressed by pushing the actuating device inside the container.

7. The filtering device according to claim 6, wherein the container comprises a respective lid, the actuating device being slidable on the lid.

8. The filtering device according to claim 7, wherein the actuating device is moved apart from the lid in the operative configuration and moved near to the lid for compressing the filtering element.

* * * * *